United States Patent
Næss-Schmidt et al.

(10) Patent No.: US 11,879,684 B2
(45) Date of Patent: Jan. 23, 2024

(54) SEPARATING FREEZER PLATES IN A HORIZONTAL PLATE FREEZER

(71) Applicant: Carsoe A/S, Aalborg Ø (DK)

(72) Inventors: Steffen Næss-Schmidt, Vodskov (DK); Jesper Poulsen, Struer (DK); Allan Hald, Skive (DK); Kyle Bennet, Humberston (DK); Kenneth Madsen, Storvorde (DK); Kenneth Poulsen, Storvorde (DK)

(73) Assignee: CARSOE SEAFOOD APS, Aalborg Øst (DK)

( * ) Notice: Subject to any disclaimer, the term of this patent is extended or adjusted under 35 U.S.C. 154(b) by 190 days.

(21) Appl. No.: 17/417,126

(22) PCT Filed: Dec. 20, 2019

(86) PCT No.: PCT/DK2019/050423
§ 371 (c)(1),
(2) Date: Jun. 22, 2021

(87) PCT Pub. No.: WO2020/135911
PCT Pub. Date: Jul. 2, 2020

(65) Prior Publication Data
US 2022/0065525 A1    Mar. 3, 2022

(30) Foreign Application Priority Data

Dec. 28, 2018  (DK) .............................. PA 2018 70866

(51) Int. Cl.
*F25D 31/00*    (2006.01)
*A23B 4/06*    (2006.01)
(52) U.S. Cl.
CPC .............. *F25D 31/001* (2013.01); *A23B 4/06* (2013.01)

(58) Field of Classification Search
CPC .......... F25D 31/001; F25D 25/04; A23B 4/06
See application file for complete search history.

(56) References Cited

U.S. PATENT DOCUMENTS

| 2,697,920 A | 12/1954 | Mackenzie |
| 4,474,032 A | 10/1984 | Fenner |
| (Continued) | | |

FOREIGN PATENT DOCUMENTS

| AU | 5350299 A | 4/2000 |
| AU | 740983 B2 | 11/2001 |
| (Continued) | | |

OTHER PUBLICATIONS

Office Action from European Patent App. No. 19831977.4 (dated Aug. 7, 2023).

*Primary Examiner* — Cassey D Bauer
(74) *Attorney, Agent, or Firm* — Cermak Nakajima & McGowan LLP; James Creighton Wray

(57) ABSTRACT

A horizontal plate freezer (1) for freezing articles inside said horizontal freezer during a freezing process comprising: a plurality of freezer plates (2) forming a stack of freezer plates, where said plurality of freezer plates are arranged substantially horizontal, defining a distance between the freezer plates, where in use articles to be frozen are arranged on one or more freezer plates, where said in stack of freezer plates are arranged between a top frame (3) and a bottom frame (4), where said top frame is arranged at a horizontal level above the stack of freezer plates, and said bottom frame is arranged at a horizontal level underneath the stack of freezer plates, at least one intervention unit (8) with at least one engaging device (10), where the engaging device is arranged moveable in a longitudinal direction along said intervention unit(s), whereby the engaging device is lifted and lowered along said stack of freezer plates, at least one (Continued)

device (6) comprising a first end positioned above a topmost freezer plate and a second end connected to said bottom frame.

10 Claims, 7 Drawing Sheets

(56) References Cited

U.S. PATENT DOCUMENTS

| | | |
|---|---|---|
| 4,553,406 A | 11/1985 | Richelli |
| 4,558,572 A | 12/1985 | Aoki |
| 2018/0051927 A1 | 2/2018 | Moller |

FOREIGN PATENT DOCUMENTS

| | | |
|---|---|---|
| AU | 751654 B2 | 8/2002 |
| CN | 104764272 A | 7/2015 |
| DE | 4324192 A1 | 1/1995 |
| DE | 4411484 A1 | 10/1995 |
| EP | 0399884 B1 | 12/1992 |
| EP | 2902736 A1 | 8/2015 |
| GB | 2207990 A | 2/1989 |
| WO | 2008003509 A1 | 1/2008 |
| WO | 2017183993 A2 | 10/2017 |

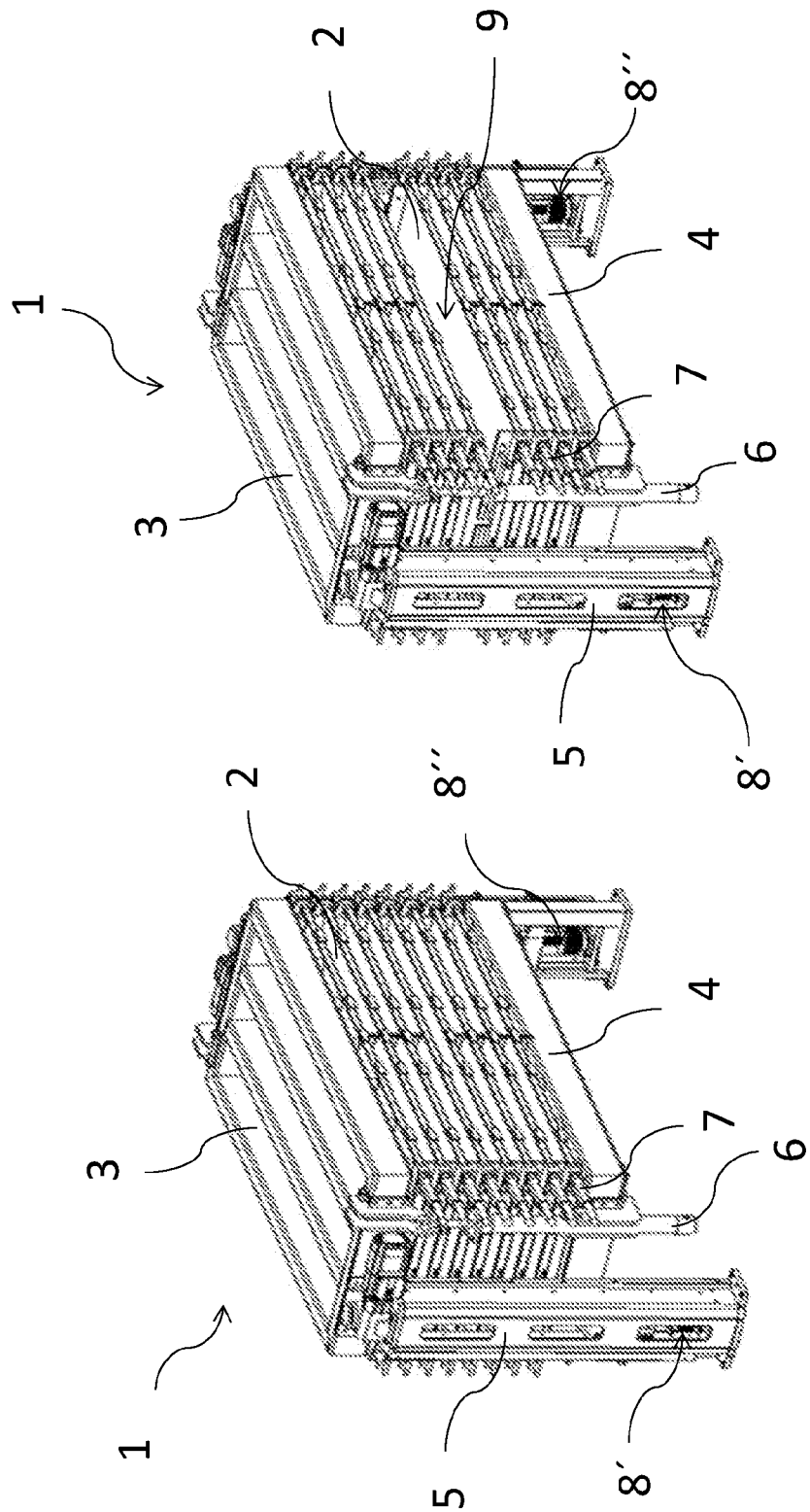

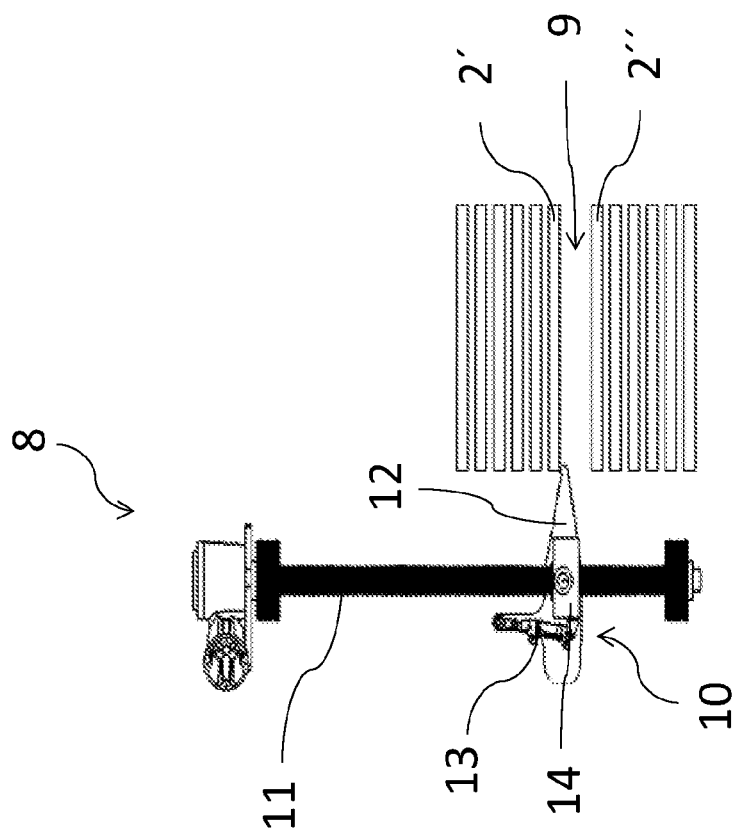
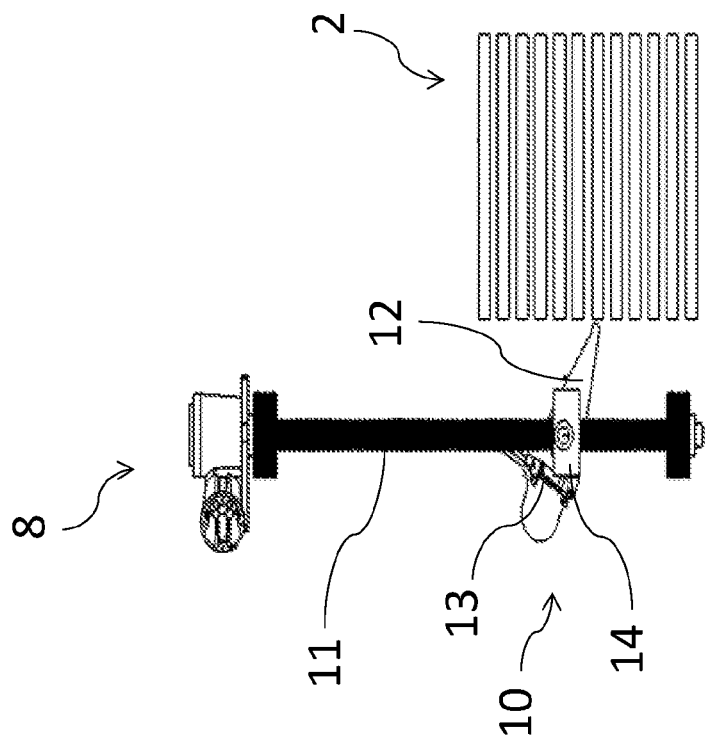
Fig. 2a
Fig. 2b

SEPARATING FREEZER PLATES IN A HORIZONTAL PLATE FREEZER

This application claims the benefit of Danish Application No. PA 2018 70866 filed Dec. 28, 2018 and PCT/DK2019/050423 filed Dec. 20, 2019, International Publication No. WO 2020/135911 A1, which are hereby incorporated by reference in their entirety as if fully set forth herein.

FIELD OF THE INVENTION

The present invention relates to an installation for loading and unloading a plate stack in a horizontal plate freezer.

BACKGROUND OF THE INVENTION

Plate freezing installations are widely used, especially within the seafood industry, both off- and on-shore.

Plate freezing installation such as a horizontal plate freezer is often installed in factory trawlers as special customized solutions, which provides various production solutions for various production processes.

WO2017183993 relates to an apparatus for emptying and filling horizontal freezers, comprising a first and a second chain actuator, said chain actuators being arranged parallel to each other and parallel to a y axis. A sliding beam is arranged between said first and second chain actuators nearby, or at the first end of said first and second chain actuators. A feeding arrangement is arranged for retracting the first and second chain actuators from an extended configuration to a collapsed configuration and for extending the chain actuators from a collapsed configuration to an extended configuration. The WO2017183993 further discloses a freezing system comprising an apparatus for emptying and filling horizontal freezers and a freezing system comprising an apparatus for emptying and filling horizontal freezers.

A further example is disclosed in US2018/0051927 wherein each freezing plate may be lifted by an arrangement arranged in either side of the plates. The arrangement includes a gripping mechanism which can be manipulated up or down by a pinion mechanism.

The horizontal freezers are processing the seafood in a rough environment on a trawler. The requirement for the robust solution is therefore important. The seafood needs to be frozen quickly after being inserted by means or pushed into a freezer plate in the horizontal freezer. After the freezing process, the frozen seafood block must quickly be released from the freezing plate in the horizontal freezers, before being transferred to a conveyor and transported into a storage room for further handling, such as packing and stacking etc.

The requirements for increased productivity and a reduction of the handling costs of frozen blocks are getting increasingly stringent in modern food industry. Therefore there is also a demand for the freezing machines/installations to function optimally and reliably. The use of mechanical displacement parts such as chains and joints in the machine's selective devices is a known challenge in rough environment, especially when filling and emptying the freezing machines. For example the use of chain actuators also requires extensive maintenance of the chains to prevent the tough environment from corroding the chain material, and furthermore preventing the extra hard wear on the joints of the chain and other component interacting with the chain. In worst case the chains will be damaged or even broken, leading to a full stop of the seafood processing.

Seafood can drastically reduce in value from soft spots & handling damage, if handled in a wrong and/or an inefficient way, or if the freezing processing of the seafood accidently and unintentionally stops. An accurate and efficient freezing process is essential not only to production time, but to the value and profitability of the product itself.

OBJECT OF THE INVENTION

The object of the invention is to provide a robust and reliable horizontal plate freezer without the mentioned disadvantages. Furthermore, it is the object of the invention to provide an accurate and efficient method for the freezing process of using the horizontal plate freezer in a freezing installation, especially when filling and emptying the horizontal plate freezer.

DESCRIPTION OF THE INVENTION

The invention addresses this object by providing a horizontal plate freezer for freezing articles inside said horizontal freezer during a freezing process comprising:
- a plurality of freezer plates forming a stack of freezer plates, where said plurality of freezer plates are arranged in substantially horizontal layers adjacent to each other, defining a distance between the freezer plates, where in use one or more freezer plates containing articles to be frozen are arranged on each of said freezer plate,
- where said stack of said freezer plates are arranged between a top frame and a bottom frame, where said top frame is arranged in a horizontal level above the stack of said freezer plates, and said bottom frame is arranged in a horizontal level underneath the stack of said freezer plates,
- at least one intervention unit with at least one engaging device, where the engaging device is arranged moveably in a longitudinal direction of said intervention units, where the engaging device is lifted and lowered along said stack of freezer plates,
- at least one displacement device comprising a first end positioned above a topmost freezer plate and a second end connected to said bottom frame,
- where said bottom frame is moveably connected to the top frame by the at least one displacement device capable of lifting and lowering the bottom frame to a predefined position, where one or more freezer plates rests on the bottom frame,
- where said engaging device can engage individual ones of said plurality of freezer plates, and where said engaging device engages an individual freezer plate and displaced along the stack of freezer plates, and thereby provides an increased distance between two individual freezer plates, and maintain the increased distance during loading and unloading at or from said freezer plates.

The horizontal plate freezers are often used for fast freezing of, for example, fish, meat, poultry and vegetables. In a horizontal freezer the articles which are to be frozen, are arranged in a stack of horizontal lays in trays or boxes. The horizontal plate freezing installation is an automated filling, emptying and pressing installation, where the horizontal plate freezer is being filled with trays containing food articles, which are being frozen to a predefined temperature. The horizontal plate freezer is emptied when the trays containing food articles have reached the predefined temperature. The frozen blocks formed by the freezing plates and the trays are then transferred to the next following process, where the frozen blocks may be packed, stacked and stocked.

The freezer plates are arranged on top of each other in the horizontal plate freezer, where freezer plates are arranged in substantially horizontal layers. The freezer plate may partly or fully comprise liquid cooled aluminium freezer plate, and a freezer plate may contain a plurality of trays in one freezing process. One or more trays may contain food articles to be frozen, when arranged in or on a freezer plate in the horizontal plate freezer.

The freezer plates are arranged between the top frame and the bottom frame. The bottom frame is arranged in a horizontal level underneath the stack of freezer plates. The bottom frame may support all or some of the freezer plates when lifting and lowering the all or some of the freezer plates. The bottom frame also supports the freezer plates during the freezing process, when the freezer plates are pressed together between the top frame and the bottom frame.

The intervention unit comprises at least one engaging device. The engaging device interacts with the freezing plates during filling and emptying the horizontal plate freezer. The engaging device may be arranged, so the engaging device may be moveable, up and down, parallel to the longitudinal direction of said intervention units. The engaging device may be elevating along said intervention unit, passing the freezing plates one by one. When reaching the level of the predefined selected freezer plate to be filled or emptied, the engaging device stops. The engaging device may lift the freezer plate or freezer plates above the selected freezer plate, so the freezer plate is accessible and the trays may be handled accordantly to the freezing process.

The intervention unit may be arranged partly or totally integrated in the support column, in a way so the engaging device still may be able to interact freely with all the freezer plates in the stack.

A displacement device may be arranged parallel to the intervention unit. The first end of the displacement device may be attached to the top frame by attachable means. The second end is attached to the bottom frame using attachable means. The displacement device may elevate the bottom frame in relation to the top frame, for example by lifting and lowering the bottom frame.

When the horizontal plate freezer is in the freezing process the horizontal freezer may fill the freezer plates, empty the freezer plates or press the freezer plates. When filling or empting the freezer plates, the displacement device lowering the bottom frame, so a space is provided between one or more freezer plates in the stack. The engaging device may then be elevated and placed in position at the predefined selected freezing plates. The engaging device may lift the freezer plate or freezer plates above the selected freezer plate, so a space is provided between the selected freezer plates and the freezer plate above the selected freezer plates, and the freezer plate may be accessible for displacement trays in and/or out of the horizontal plate freezer. When the filling or empting process is completed the displacement device lifts the bottom frame toward the top frame, and into a pressing position.

This horizontal plate freezer is providing a rapid and energy efficient freezing process. The horizontal plate freezer reduces the cycle time for each batch going in or out of the trays, due to the fast displacement shifts. The horizontal plate freezer provides a uniformly flat surface on the frozen blocks of food. The blocks are easy to stack and store, which optimizes the space efficiency in the palletizing. The rapid freezing provided by this invention preserves the products' quality and minimizes the production time, and at the same time allowing the horizontal plate freezer a long lifespan in harsh marine environments. The freezing process provides a minimal energy consumption, easy installation and maintenance costs.

In an advantageous embodiment of the invention, said at least one displacement device is an actuator, where a top of said actuator is positioned above a topmost freezer plate and a bottom of said actuator is connected to the bottom frame, where said actuator is capable of providing a force between said top frame and said bottom frame, at least in an upwards displacement direction of the bottom frame, possibly also in a downwards displacement direction of the bottom frame.

The displacement device may comprise an actuator having a first end and a second end, where the first end may be located near by the top frame, and the second end is attached to the bottom frame using attachable means. The first end may be attached to the top frame and/or the support column. The first end may be dedicated to be a fix point, and the second end may be dedicated to be a moveable point in the longitudinal direction of the displacement device in relation to the first end. The first end and the second end may be dedicated in reverse, so the second end is fixed and the first end is moveable in relation to the second end.

The actuators perform the functions of providing an increased distance between the freezing plates. The use of actuators reduces the overall height of the horizontal plate freezer and enabling the horizontal plate freezer to satisfy the low headroom requirements of e.g. a fishing vessel. The actuator may also be useful during repair of the intervention unit. The actuator lower the bottom frame onto the surface below the bottom frame and thereby supports all the weight of the top frame and enabling the detachment of the intervention unit. The actuator may be hydraulic, pneumatic or electrical. The attachable means may be bolts, nuts, screws or similar.

In a further advantageous embodiment of the invention, at least one support column is arranged in a longitudinal direction perpendicular to said top frame, to said bottom frame and said stack of freezer plates, where said top frame is connected to said at least one support column, forming a main frame for the horizontal plate freezer.

At least one support column is arranged in a longitudinal direction perpendicular to said top frame, to said bottom frame and said stack of freezer plates. The support columns provide a solid frame construction to the horizontal palate freezer, where the bottom frame may be displaced respective to the top frame.

The top frame, which may be attached to one or more support columns using said attachment means, may be one solution in providing a main frame of the horizontal plate freezer. The length of the support columns and the area of the bottom frame determine the freezing capacity volume of the plate horizontal freezer. Within the main frame the bottom frame may be elevated in relation to the longitudinal direction of the support column. The bottom frame may be a moveable frame supporting a plurality of freezer plates arranged in the main frame. The bottom frame is elevated towards said top frame, and placed in a pressing position when freezing the articles in the trays. The bottom frame is elevated away from said top frame, so an opening between the top frame and the freezer plates are provided. The opening ensures that the freezer plates are able to be moved away from each other into a predefined position, so that a increased distance may be provided between the freezer plates during the replacement process, where the trays are moved in and out of the freezer plates.

In a further advantageous embodiment of the invention, at least one support column is arranged in a longitudinal direction perpendicular to said top frame, to said bottom frame and said stack of freezer plates, where said bottom part is connected to said at least one support column, providing a main frame of the horizontal plate freezer.

At least one support column is arranged in a longitudinal direction perpendicular to said top frame, to said bottom frame and said stack of freezer plates. The support columns provide a solid frame construction to the horizontal palate freezer, where the top frame may be displaced respective to the bottom frame.

The bottom frame may be attached to one or more support columns using said attachment means, which may provide an alternative solution for a main frame construction of the horizontal plate freezer. Within the main frame the bottom frame may be elevated in relation to the longitudinal direction of the support column. The length of the support columns and the area of the top frame co-determine the freezing capacity volume of the horizontal plate freezer. The top frame may be a moveable frame carrying a plurality of freezer plates arranged in the main frame. The top frame may be elevated towards and/or away from the bottom frame. The top frame may be elevated above the support columns.

The top frame may in one situation be lowered towards the bottom frame and placed in a pressing position, when freezing the articles. When the top frame in another situation may by lifted upwards and away from the bottom frame, an increased distance between the bottom frame and the freezer plates may be provided. The increased distance ensures that the freezer plates are able to be moved away from each other into a predefined position, so that an increased distance may be provided between two freezer plates during the replacement process, where the trays are moved in and out of the freezer plates.

The engaging device is capable of lifting and/or lowering the individual freezer plates between said top frame and said bottom frame. The engaging device supports a selected individual upper freezer plate and possibly one or more other freezer plates positioned above the upper freezer plate. The bottom frame supporting an underlying freezer plate and one or more other freezer plates. When said engaging device lifts the freezer plate or freezer plates, the distance increases between the upper freezer plate supported by the engaging device and the underlying freezer plate supported by the bottom frame.

The engaging device is capable of holding the individual freezer plate in a fixed position in relation to the main frame by the engaging device being fixed in relation to the displacement device for a period of time during, which the individual freezer plate is to be held in the fixed position in relation to the main frame.

The engaging device is capable of holding the individual freezer plate in a fixed position relation to the main frame by the engaging device being fixed in relation to the at least one support column for a period of time during which the individual freezer plate is to be held in the fixed position in relation to the main frame.

In a further advantageous embodiment of the invention, said engaging device comprises at least one pivoting latch, where said pivoting latch supports and/or moves at least one freezer plate from a first position to a second displaced position between said top frame and said bottom frame.

The bottom frame supports the freezer plates. When the bottom frame may be moved downwards away from top frame, a space between the stack of freezer plates and the top frame will occur. The increased distance will make it possible for the pivoting latches to engage the freezer plates, and force the freezer plates upwards toward the top frame by lifting the freezer plates with the tip of the pivoting latches. The freezer plate below the tip of the pivoting latches may then be accessible for replacement of the trays arranged inside the selected freezer plate. After the replacement has being executed, the pivoting latches lower the freezer plates down toward the selected freezer plate, and reunite the freezer plates, still supported by the bottom frame. The bottom frame carrying the freezer plates is then lifted toward the top frame and the freezer plates are restrained in a pressing position.

The pivoting latches may also support the freezer plates in a predefined position instead of lifting the freezer plates. It may be possible for the pivoting latches to engage with one or more freezer plates, before the bottom frame and the supported freezer plate are displaced downwards. After the replacement of the trays has being executed, the bottom frame, which supports the underlying freezer plates is then lifted toward the top frame and the freezer plates are restrained in a pressing position.

In a still further advantageous embodiment of the invention, said intervention unit comprises a threaded spindle, where said engaging device comprises a threaded aperture, where the threaded spindle is arranged moveably inside the threaded aperture, where said engaging device is arranged moveably in a longitudinal direction of said threaded spindle, where said threaded spindle lifting and lowering said engaging device along said intervention unit and capable of holding the engaging device in a predefined elevated position.

The engaging device may be lifted and lowered in the horizontal plate freezer, so the engaging device may be moved from a first predefined freezer plates to a second predefined freezer plate. The engaging device may for example be lifted, when the threaded spindle is turned in a first direction around the longitudinal direction of the spindle, and the engaging device may be lowered, when the threaded spindle is turned in a second direction opposite to the first direction around the longitudinal direction of the spindle.

The spindle may be of metal and/or composite material, which is suitable for a hard environment, where the horizontal plate freezer may be exposed to low temperatures and seawater climate.

The invention further relates to an engaging device for handling freezer plates in a plate freezer, where said engaging device comprises at least one pivoting latch, at least one connecting base and at least one actuator, where said pivoting latch is moveably attached to the connecting base, where said actuator has a first end and a second end, where the first end is attached to the pivoting latch, and the second end is attached to an connecting base, where said actuator is capable of controlling the pivoting of said at least one pivoting latch in relation to the connecting base, where said pivoting latch is capable of supporting and moving at least one freezer plate into a predefined position providing a predefined increased distance between said at least one freezer plate and at least on underlying freezer plate.

The engaging device may comprise at least one pivoting latch, where said pivoting latch may engage the freezer places, where the pivoting latch supports and/or moves at least one freezer plate in a predefined position proving a predefined increased distance between said freezer plates in the horizontal plate freezer.

An alternative solution is provided by using at least one first pivoting latch and at least one second pivoting latch, where said first pivoting latch may engage, lift and support the predefined freezer plates to be lifted, where the second pivoting latch engages and pushes the underlying freezer plates downwards toward the bottom frame, where the distance between the predefined freezer plate and the underlying freezer plate is the increased distance available, when filling and emptying the trays in the underlying freezer plate in the horizontal plate freezer.

The engaging device may comprise actuator, which pivoting the pivoting latches in and out of engaging contact with the freezer plates. The actuators may control the function of the pivoting laches very accurate, and at the same time is very agile and in a fast speed.

At least within this description and claims "actuator" shall be understood as any unit which transfers a force or creates a movement. The actuator may be linear or a rotary actuator (for example comprising a spindle, rack and pinion etc.), but is not limited to these examples.

The actuator may be one or more actuators, where the actuator handles the pivoting of said pivoting latches. The actuator may be provided with a first end and a second end, where the first end may be attached to the connecting base, and the second end may be attached to the pivoting latches using attachable means, such as bolts, nuts, screws or similar. The first end may be dedicated to be a fix point, such as the point where the first end is attached to the connecting base. The second end, for example the piston rod of the actuator which may be extended and shortened as needed, may be dedicated to be a moveable point in relation to the first end, such as the pivoting latches. The first end and the second end may also be chosen to be dedicated reversed, so the second end is fixed to the connecting base, and the first end is moveable in relation to the second end and attached to the pivoting latches. The actuators may be hydraulic, pneumatic or electrical.

In an advantageous embodiment of the invention, said engaging device comprises one or more support bars extending perpendicular to said freezer plate and capable of taking up load from said pivoting latch, where the pivoting latch is supported by the one or more support bars and is capable of displacing along the support bars, where said actuator are capable of pivoting the pivoting latch between a first position where the pivoting latch is disengaged from said freezer plate and a second position where the pivoting latch is engaged with said freezer plate, and where at least part of the load from said freezer plate, possibly holding one or more freezing trays, to the pivoting latch, when the pivoting latch is engaged with said freezer plate, is transferred to said support bars.

The pivotable latches may pivot out and engaged with an upper freezer plate, where the load or part of the load from the upper freezer plate is transferred to the tip of the pivotable latches. The force provided by the load on the pivotable latches is distributed equally on all pivotable latches and further on to the spindle nuts connecting the pivoting latches to the connection base.

Because the load on the tip of the pivotable latches may be in offset position form the centre of the spindle, a support bar is provided on the connecting base parallel with the spindle. To prevent the spindle from overloading and flexing the pivoting latch and spindle nut, the pivoting latch is clamp to the support bar, which may be connected to the support column.

The force applied on the pivoting latches is transferred to a horizontal force. The support column will absorb all bending moment caused by the force from the load, which is transferred from the support bar to the support column. The spindle will only be stained by vertical forces directly in center of the spindle transferred through spindle nuts. This prevents the spindle from overload.

In a further advantageous embodiment of the invention, said connecting base is provided with an internally applied threaded aperture for an externally threaded spindle, and with the proviso that one or more supporting bars are provided, a rotation of the threaded spindle moves the connecting base, the pivoting latches and the support bars upwards or downwards along the threaded spindle.

The connecting base of the engaging device may be elevated from a first predefined freezer plate to a second predefined freezer plate, for example by being elevated upwards, when the threaded spindle is turned in a first direction around the longitudinal direction of the spindle, and the engaging device may be elevated downwards, when the threaded spindle is turned in a second direction opposite to the first direction around the longitudinal direction of the spindle.

The intervention device may be arranged, so the connecting base may be moveable up and down along the longitudinal direction of said intervention units. The connecting base may be elevated and carrying the pivoting latches and the actuator along said intervention unit, passing the freezing plates one by one.

The engaging device may be lifted, when the threaded spindle is turning clockwise around the longitudinal direction of the spindle, and the engaging device may be lowered, when the threaded spindle is turned counter clockwise around the longitudinal direction of the spindle. When reaching the level of the predefined selected freezer plate to be filled or emptied, the connecting base stops, and the pivoting latches will be moved into a predetermined position, easily and smoothly supporting and/or lifting one or more freezer plates.

The invention furthermore relates to a method of loading and unloading freezer articles to and from a horizontal plate freezer according to claims 1 to 9, where the horizontal plate freezer comprising a top frame, a bottom frame, a plurality of freezer plates forming a stack of freezer plates, and at least one intervention unit with at least one engaging device and a displacement device using following steps:

a. moving the engaging device to a position of a selected individual freezer plate in the horizontal plate freezer, b. engaging the engaging device in a supporting contact with the individual freezer plate and maintaining the position, c. displacing the bottom frame with one or more freezer plates supported by the bottom frame downwards away from the top frame, thereby proving an increased distance between the selected individual freezer plate and the stack of freezer plates supported by the bottom frame, d. loading or unloading trays with articles to be frozen or having been frozen, respectively, onto or from a freezer plate supported by the bottom frame and underlying the selected individual freezer plate supported by the engaging device, e. displacing the bottom frame with the one or more freezer plates supported by the bottom frame upwards towards the top frame, thereby proving a decreased distance between the selected individual freezer plate and the stack of freezer plates supported by the bottom frame.

The horizontal plate freezer is loaded and unloaded by separating freezer plates using an engaging device, by providing one or more articles to be frozen or trays of articles to be frozen. Then elevating the engaging device to a predefined freezer plate location in the horizontal plate freezer. Then arranging the engaging device in a supporting engaging contact with the first predefined freezer plate and maintaining the position. Then displacing the bottom frame with a stack of resting freezer plates downwards away from the top frame, which provides an increased distance between the first predefined freezer plate and the stack of freezer plates resting on the bottom frame. The upper freezer plate on the stack of plates is prepared to receive the articles to be frozen. The articles are arranged onto/into the upper freezer plate. The bottom frame is displaced upwards towards the top frame and thereby applying a pressure to the stack of freezer plates. By elevating the engaging device to the next predefined freezer plate located in the horizontal plate freezer, the process may be repeated until all the freezer plates in the stack is loaded.

When the articles are frozen, the articles are unloaded and new unfrozen articles are loaded into the horizontal plate freezer. The engaging device is displaced to a predefined freezer plate location in the horizontal plate freezer. The engaging device is arranged in a supporting engaging contact with the predefined freezer plate and maintaining the position. By elevating the bottom frame with the stack of resting freezer plates downwards away from the top frame, an increased distance is provided between the first predefined freezer plate and the stack of freezer plates resting one the bottom frame. The upper freezer plate on the stack of plates is prepared to be unloaded and reloaded simultaneously, so the trays with the frozen articles can be removed and replaced by other articles to be frozen. The bottom frame is then elevated upwards towards the top frame and the stack of freezer plates is arranged in position under pressure. Again, the engaging device is relocated to the next predefined freezer plate in the horizontal plate freezer, and the next cycles can be activated, by repeating the process.

To optimize the freezing process the horizontal plate freezer is loaded in a freezing process sequence where only every other layer is loaded with unfrozen product trays. The predefined freezer plate location is elected from a freezing process sequence which is divided into two sub-sequences where the first subsequence is electing every odd number of freezer plates in the stack, followed by a second subsequence electing every even number of freezer plates in the stack.

By doing this a freezer plate is newer loaded with fresh product trays on both sides straight after another and thereby the load on the horizontal plate freezer is spread out more evenly throughout the entire freezer. This optimizes the capacity of the horizontal plate freezer, and provides a more efficient and fast freezing process.

To ensure a high quality and an efficient high performing horizontal plate freezer, the freezer plates and other plates may be aluminium plates of high mechanical and anticorrosive resistance. The outer surface of the freezing plate, which comes in contact with trays is flat and smooth, which ensures good thermal contact for heat transfer and high standards of hygiene. The all steel welded heavy duty framework may be fully hot dipped galvanized for protection against corrosion or similar. The frame work is designed with hygiene in mind and the whole freezer can be quickly and easily hosed down if required.

DESCRIPTION OF THE DRAWING

The present invention will now be explained with reference to the accompanying drawings wherein:

FIGS. 1a and 1b: Illustrating a horizontal plate freezer with a plurality of freezer plates.

FIGS. 2a and 2b: Illustrating an intervention unit lifting plates in a stack.

DETAILED DESCRIPTION OF THE INVENTION

Figure 3:
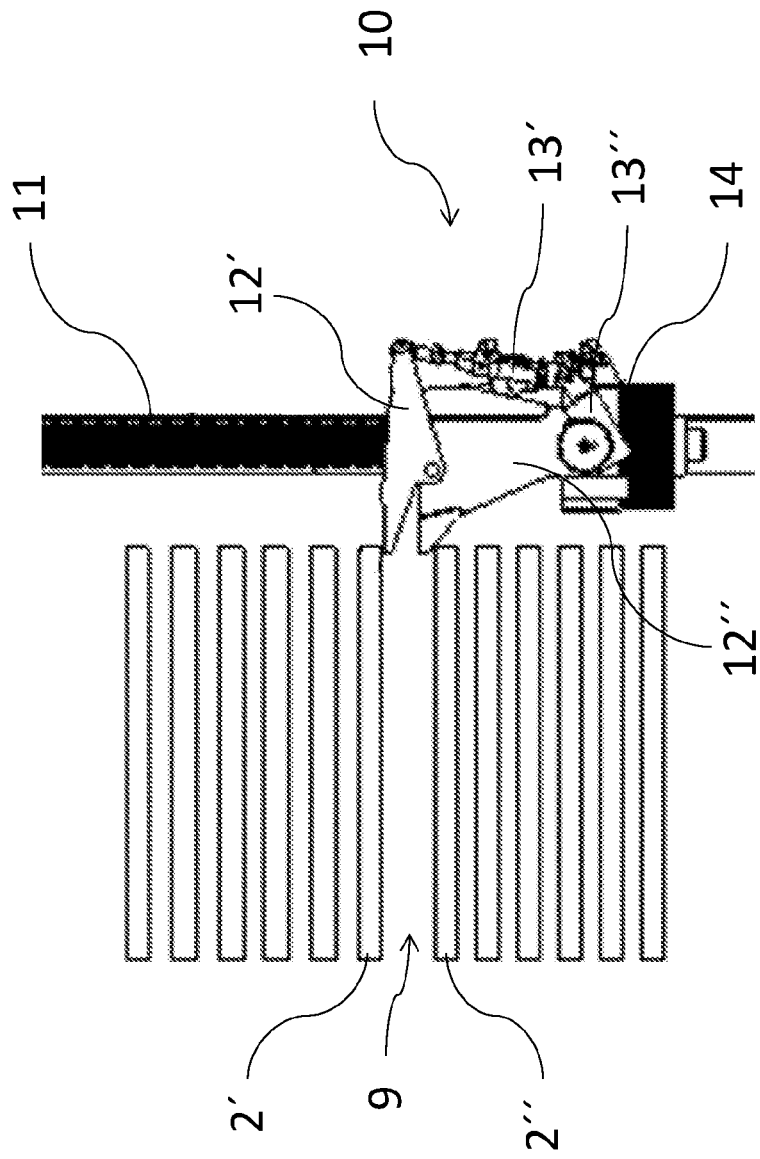
FIG. 3: Illustrating an engaging device using a first and a second pivoting latch.

An embodiment of the present invention is explained in the following detailed description. It is to be understood that the invention is not limited in its scope to the following description or illustrated in the drawings. The invention is capable of other embodiments and of being practiced or carried out in various ways.

FIG. 1a and FIG. 1b illustrates a horizontal plate freezer 1 with a plurality of freezer plates 2. The horizontal plate freezer 1 is freezing food articles arranged in trays. The trays are handled by filling, freezing and emptying the horizontal plate freezer 1 according to a predefined freezing process.

The horizontal plate freezer 1 comprises a plurality of freezer plates 2 arranged in a stack in the horizontal freezer. The plurality of freezer plates 2 are arranged in substantially horizontal layers on top of each other. One or more trays containing food articles to be frozen are arranged on each of the freezer plates 2.

The freezer plates 2 are arranged in a stack between a top frame 3 and a bottom frame 4. The top frame 3 is arranged in a horizontal level above the stack of the freezer plates 2, and said bottom frame 4 is arranged in a horizontal level underneath the stack of said freezer plates 2.

One support column 5 is provided in each end of the horizontal plate freezer 1, where the support column is arranged in a longitudinal direction perpendicular to the top frame 3. The support columns 5 are attached to the top frame 3 using attachment means, e.g. bolts, nuts or similar. The support columns 5 and the top frame 3 form a main frame for the horizontal plate freezer. The length of the support columns 5 substantially equals the height of the horizontal plate freezer 1, and the limitation of the numbers of freezer plates 2 to be contained in the horizontal plate freezer 1.

The bottom frame 4 is moveably attached to the top frame 3 by using displacement devices 6. The displacement device 6 comprises a first end and a second end where the first end is substantially near the top frame 3, and the second end is attached to the bottom frame 4 using attachable means. The displacement device 6 in this example is a hydraulic actuator, but could as well be a pneumatic or electrical actuator. The displacement device 6 is able to elevate the bottom frame 4 upwards or downwards inside the main frame for the horizontal plate freezer 1, while the bottom frame 4 is carrying the stack of freezer plates 2.

Intervention units 8',8" are arranged inside the support column 5, so the engaging device can engage said freezer plates 2. The engaging devices are providing a increased distance 9 between two freezer plates 4 during loading and unloading the trays in and out of the freezer plates 2. The inlet manifolds 7 supply liquid coolant to the freezer plates.

FIGS. 2a and 2b illustrate an intervention unit 8 that is lifting freezer plates 2, where the freezer plates 2 are arranged in a stack. The intervention unit 8 comprises a spindle 11 and an engaging device 10. The engaging device 10 comprises a pivoting latch 12, an actuator 13 and a connecting base 14. The connecting base 14 is provided with an aperture, where the spindle 11 fits into. The connecting base 14 can be elevated upwards and downwards the spindle 11, and thereby relocate the engaging device 10.

The actuator 13 may in this example be a hydraulic actuator. The actuator 13 may be provided with a first end and a second end. The first end is dedicated to a fix point, and is attached to the connecting base 14. The second end may be attached to the pivoting latch 12 using attachable means, such as bolts, nuts and screws or similar. The second end could be a piston rod of the actuator 13, which may be extended and shortened as needed, and is dedicated to be a moveable point in relation to the first end, attached to the pivoting latches 12.

The pivoting latch 12 is supporting the freezer plates 2 above the underlying predefined freezer plate, 2". In this example the pivoting latch 12 engages, lifts and supports one freezer plate 2' and the upper lying freezer plates 2, above the underlying freezer plates 2 in the stack.

FIG. 3: Illustrating an engaging device using a first and a second pivoting latch 12. The engaging device 10 comprises a first pivoting latch 12' and a second pivoting latch 12", a first actuator 13' and a second actuator 13". The first pivoting latch 12' and a second pivoting latch 12" are pivotally attached to the connecting base 14. The first actuator 13' and the second actuator 13" are also attached to the connecting base 14. The first actuator 13' is moveably attached to the first pivoting latch 12', and the second actuator 13" is moveably attached to the second pivoting latch 12". The connecting base 14 is provided with an aperture, where the spindle 11 is passed through, so the connecting base 14 is arranged moveably on the spindle 11. The connecting base 14 can be elevated upwards and downwards the spindle 11, and thereby relocated on the spindle 11.

The first actuator 13' is engaging and supporting the predefined freezer plate 2'. The second actuator 13" is engaging and forcing the underlying freezer plate 2" down wards. This provides a increased distance 9 between the predefined freezer plate 2' and the underlying freezer plate 2". The increased distance 9 is provided for an easy and agile filling/emptying process of the trays in the underlying freezer plate 2".

The pivoting latch 12 is supporting the freezer plates 2 above the underlying predefined freezer plate, 2". In this example the pivoting latch 12 engages, lifts and supports one freezer plate 2' and the upper lying freezer plates 2, above the under lying freezer plates 2 in the stack.

Figure 4B:
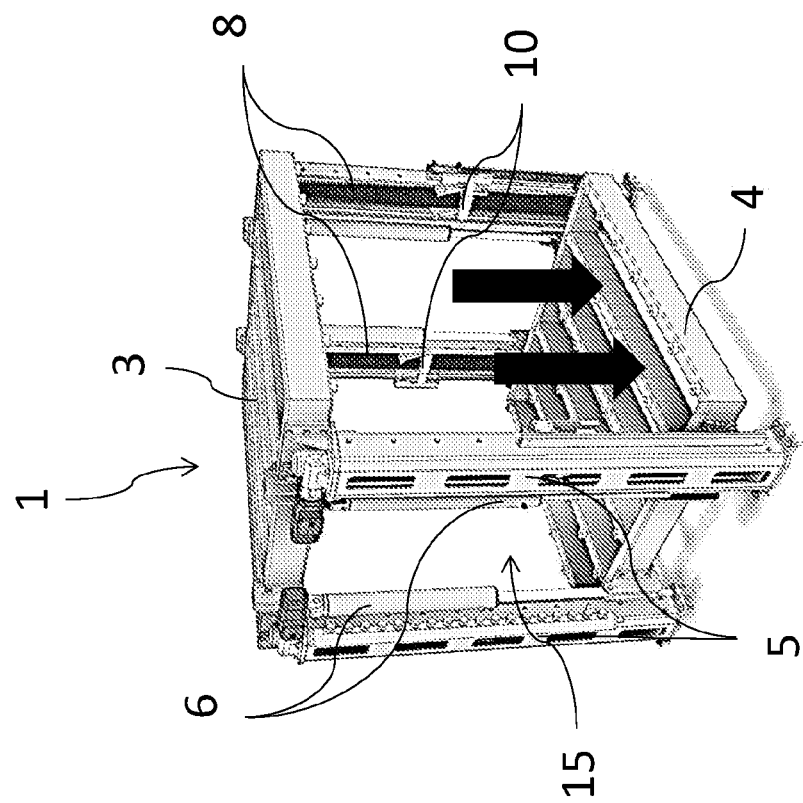
FIGS. 4a and 4b: Illustrating a main frame with a moveable bottom part.
Figure 4A:
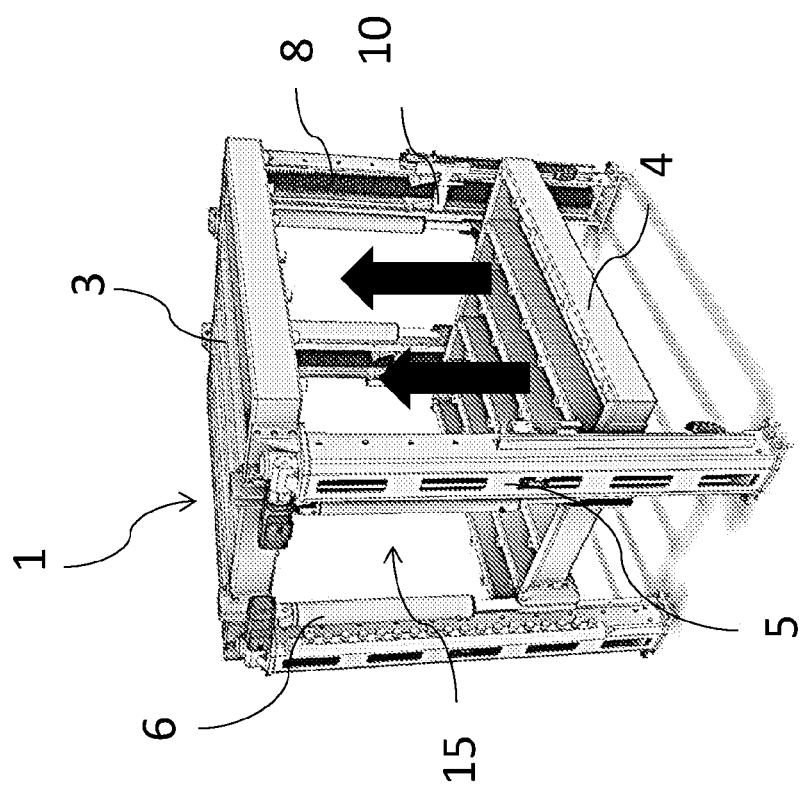

FIGS. 4a and 4b: Illustrating a main frame comprising a top frame 3 and four support columns, provided with a moveable bottom part 4. The top frame 3 is arranged in a horizontal level and the bottom frame 4 is arranged in a horizontal level underneath the top frame 3. Four support column 5 are provided, two support columns 5 in each end of the top frame 3. The support columns 5 are arranged in a longitudinal direction perpendicular to the top frame 3. A first end of the support columns 5 is attached to the top frame 3 using attachment means, and a second end of the support columns 5 is arranged on an underlying surface. The four support columns 5 and the top frame 3 form a substantially square main frame with an inner volume 15. The length of the support columns 5, the area of the top frame 3 is the outer limitation of the capacity to be contained in the horizontal plate freezer 1.

The bottom frame 4 is moveably attached to the top frame 3 by using four displacement devices 6. The four displacement devices 6 comprise each a first end and a second end, where the first end is attached to the top frame 3, and the second end is attached to the bottom frame 4 using attachable means. The four displacement devices 6 in this example are a hydraulic actuator, but could as well be a pneumatic or electrical actuator. The four displacement devices 6 are arranged parallel to the support columns 5, one displacement device 6 is arranged adjacent to one support column 5, so they are arranged in pairs. The displacement devices 6 are able to elevate the bottom frame 4 upwards or downwards inside the main frame for the horizontal plate freezer 1 simultaneously and synchronously.

In FIG. 4a the bottom frame is lifted upwards towards the top frame 3, and in FIG. 4b the bottom frame is lowered downwards away from the top frame 3. An intervention unit 8 is arranged inside each of four support columns 5, and the inner side of the support columns 5 are open, so the engaging devices 10 can move freely in the support column 5 and the inner volume 15 of the main frame.

Figure 5:
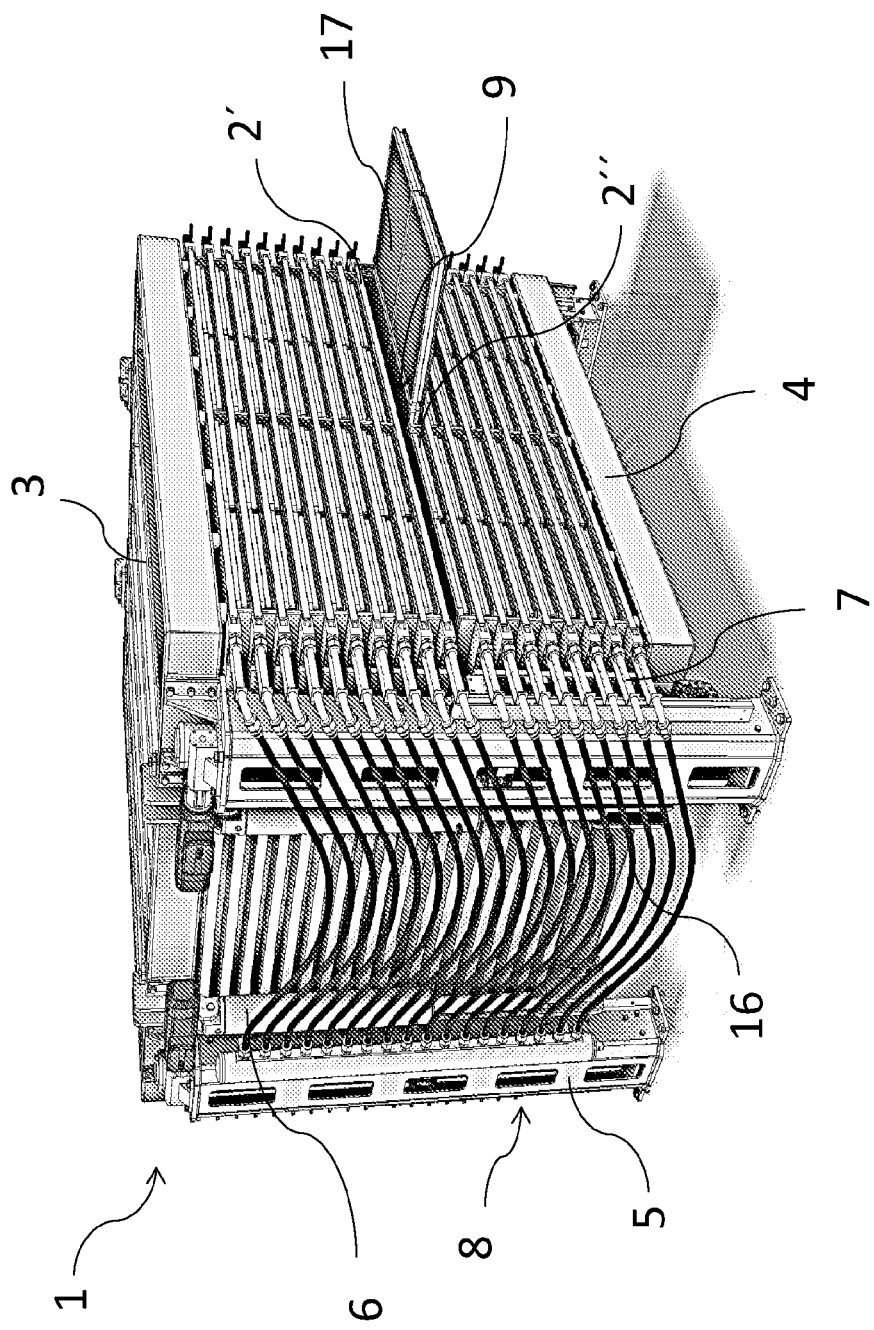
FIG. 5: Illustrating a horizontal plate freezer filled with trays in freezer plates.

FIG. 5: Illustrating a horizontal plate freezer 1 filled with trays 17 in freezer plates 2. The horizontal plate freezer 1 corresponds the horizontal plate freezer 1 showed in FIG. 4a and FIG. 4b. The horizontal plate freezer 1 comprises a top frame 3 and four support columns 5, provided with a moveable bottom part 4 carrying eighteen layers of freezer plates 2. Every freezer plate 2 carries a plurality of trays with food articles to be frozen. The top frame 3 is arranged in a horizontal level and the bottom frame 4 is arranged in a horizontal level underneath the top frame 3. The eighteen layers of freezer plates 2 are each arranged in a horizontal level between the top frame 3 and the bottom frame 4 within the inner volume 15, showed in FIG. 4a.

When the horizontal plate freezer 1 is in the freezing process the horizontal plate freezer fills all the eighteen layers of freezer plates 2 with trays. The actuators 6 are attached to both the top frame 3 and bottom frame 4, lifting and lowering the stack of layers of freezer plate 2 and for applying pressure to the stack of layers of the freezer plates 2. The inlet manifold 7 supplies liquid coolant to each of the freezer plates 2 via flexible hoses 16, and on the opposite side of the horizontal plate freezer 1 attached to each freezer plate 2 an outlet manifold receives liquid coolant from the layers of freezer plates 2. The freezer plates 2 may be manufactured from extruded aluminium alloy sections with internal passages for refrigerant.

A method of filling and emptying the horizontal plate freezer 1 is provided by separating layers of freezer plates 2 using an intervention unit 8. A controller is arranged internal or external the horizontal plate freezer 1, and controls the freezing process.

When starting the freezing process a plurality of trays 17 with food articles to be frozen are provided. The intervention unit 8 is elevating the engaging devices 10 to a predefined layer of freezer plate 2 located in the horizontal plate freezer 1. The engaging devices 10, showed in FIG. 3, are arranged in a supporting engaging contact with the first predefined layer of freezer plate 2 and maintaining the position. The bottom frame 4 with a stack of resting layer of freezer plates 2 is elevated downwards away from the top frame 3. A increased distance 9 is provided between the first predefined layer of freezer plate 2' and the stack of layers of freezer plates 2 resting one the bottom frame 4. An upper layer of freezer plate 2" on the stack of layers of freezer plates 2 is prepared to receive the trays 17 with food articles to be frozen. The trays 17 with food articles to be frozen are filled onto or into the upper layer of freezer plate 2".

The bottom frame 4 is elevated upwards towards the top frame 3 and applying a pressure to the stack of layers of freezer plates 2. The pressure provides a fast freezing effect and at the same time prevents the food articles in the trays from expanding uneven during the freezing process.

The engaging device 10 is now relocated to the next predefined layer of freezer plate 2 located in the horizontal plate freezer 1. The next predefined layer of freezer plate location is elected from a freezing process sequence, which is divided into two subsequences. The first subsequence is electing every odd number of freezer plates 2 in the stack, followed by a second subsequence electing every even number of freezer plates 2 in the stack. This means that the first layer of freezer plate 2 is loaded and then the third layer of freezer plate 2 is loaded and further onto the seventeenth layer of freezer plate 2 has been loaded. Then the filling process starts from the top again loading the second layer of freezer plate 2 and then the fourth layer of freezer plate 2 until the eighteenth layer of freezer plate 2 has been loaded. This is processed until all the freezer plates 2 are filled with trays 17. Then the freezing process cools the temperature of the trays 17 down, and all the trays 17 with food articles to a predefined temperature before the freezer plates 2 are emptied and/or refilled.

The next sequence for refilling the trays with food articles to be frozen follows. The engaging devices 10 are elevated to a first predefined layer of freezer plate 2' located in the horizontal plate freezer 1 starting with the first subsequence followed by the second subsequence. When reaching the first predefined layer of freezer plate 2' location, the engaging device 10 is arranged in supporting engaging contact with the first predefined layer of freezer plate 2' and the engaging device 10 maintains the position. The bottom frame 4 with the stack of resting layer of freezer plates 2 is elevated downwards away from the top frame 3, and proving the increased distance 9 between the first predefined layer of freezer plate 2' and the stack of layer of freezer plates 2. The upper layer of freezer plate 2" on the stack of layer of plates 2 is to be emptied and reloaded in one cycle, so the trays 17 with the frozen food articles in the upper layer of freezer plate 2" on the stack of layer of plates 2 can be removed and replaced by other trays 17 with food articles to be frozen. The bottom frame 4 is elevated upwards towards the top frame 3 and applied pressure to the stack of layer of freezer plates 2. The engaging devices 10 are elevated to the next predefined freezer plate location according to the active subsequence. The replacement of trays 17 is processed until some or all the freezer plates 17 are filled/refilled with trays with articles to be frozen. Then the next cycles can be activated, and thereby repeating the freezing process accordantly.

Once one layer of freezer plates 2 is loaded with unfrozen food articles placed in trays 17, a timer is set in the horizontal plate freezer's 1 controller. The timer monitors that specific layer with freezer plates 2. When it is due for replacement with trays with food articles to be frozen, the replacement process will be activated. The timer also monitors the layer of freezer plates 2 for when it is critical for emptying and the monitor will initiate a warning and immediately start the emptying process.

After each loading of trays 17 with food articles to be frozen into the horizontal plate freezer 1, pressure will be applied between the top frame 3 and bottom frame 4. This will press all layers of freezer plates 2 and trays 17 tightly together resulting in the optimal conditions for heat transfer between trays and freezer plate 2. At the same time the pressure also prevents the food articles to be frozen from expanding uneven during the freezing process.

Figure 6B:
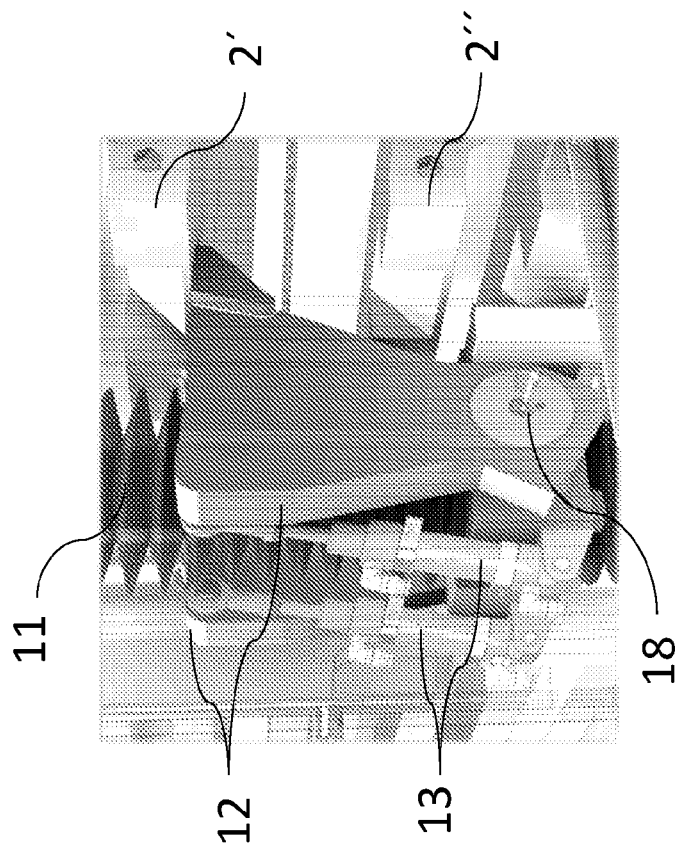
FIGS. 6a and 6b: Illustrating the assembling of an engaging device on a spindle in the intervention unit.
Figure 6A:
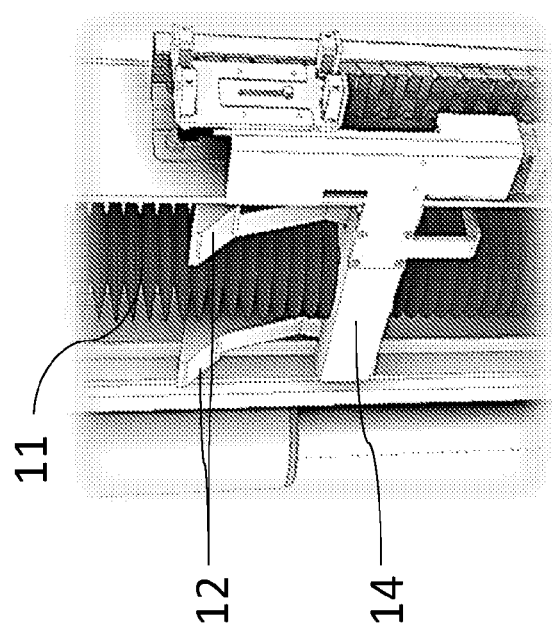

FIGS. 6a and 6b: Illustrating the assembling of an engaging device 10 on a spindle 11 in the intervention unit 8. FIG. 6a is presenting a view from the inside of the main frame, where the freezer plates are stacked, and 6b is presenting a view from the outer side of the main frame. The intervention unit 8 is arranged in the support column 5, and a gear motor driven spindle 11 is mounted. The engaging device comprising two pivoting latches 12 is attached to the spindle nut 18. The pivoting latches 12 are pivoted out towards the freezing plates 2 and engaged with the predefined freezer plate 2'. The actuators 13, a hydraulic actuator, are displacement the pivoting latches back and forth and thereby controlling the position of the pivotable latches 12. The load from the predefined freezer plate 2' is distributed equally on tip of the pivoting latches 12 and further on to the spindle nuts 18. The underlying freezer plate 2" is ready to be refilled.

Because the load on the pivoting latches 12 is offset from the center of the spindle 11 a bending moment is applied to the spindle 11. To prevent the spindle 11 from overloading and flexing, the pivoting latches 12 and spindle nut 18 are designed to clamp around a heavy duty flat bar, which is attached to the support column 5. The support column 5 will absorb all bending moment and horizontal forces caused by the load from the predefined freezer plates 2' and trays 17.

The intervention unit comprises a threaded spindle 11. Each spindle 11 is driven by standard AC motors that are synchronized by the means of electrical encoders inside each motor, which is not shown on FIG. 6. The connecting base comprises a threaded aperture, where the treaded spindle 11 is arranged moveably inside the threaded aperture. The engaging device is arranged moveably in a longitudinal direction of the threaded spindle, elevating the engaging device along the intervention unit. The rotation of the spindle 11 controls the elevation of the engaging device 10.

Figure 7:
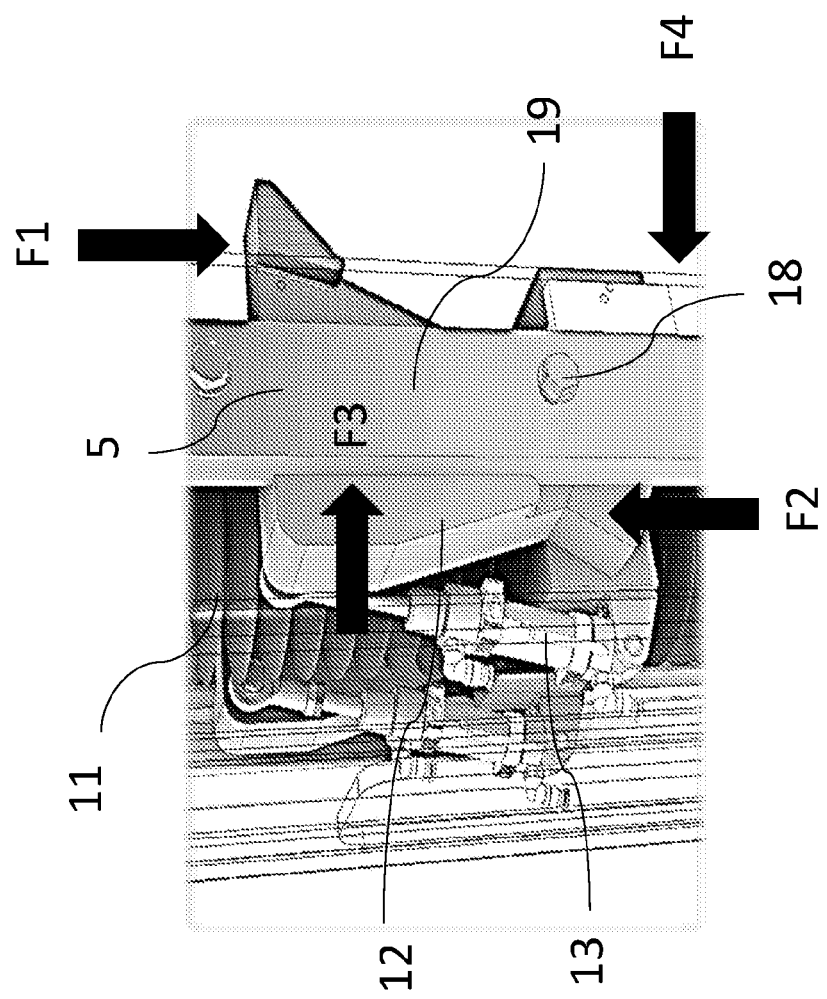
FIG. 7: Illustrating the impact of load on the pivoting latches.

FIG. 7 illustrates the impact of load provided on the tip of pivoting latches 12. An engaging device with support bars 19 extending parallel to the spindle 11 and capable of taking up load from two pivoting latches 12. The pivoting latch 12 is supported by the support bar 19. The support bar 19 is displaced along the supporting column 5. The actuator 13 are capable of pivoting the pivoting latch 12 between a position, where the tip of the pivoting latch 12 is engaged with a freezer plate, and at least part of the load is transferred from the freezer plate to the pivoting latch 12.

When the pivotable latches 12 are pivoted out and engaged with a upper freezer plates, which causes transfer of force from the load from the upper freezer plate to the tip of the pivotable latches 12. The force caused by the load on the pivotable latches 12 is illustrated with arrow F1 and F2, are distributed equally on all pivotable latches and further on to the spindle nuts 18.

Because the load on the tip of the pivotable latches 12 is offset form the center of the spindle 11, a bending moment is applied to the spindle 11. To prevent the spindle 11 from overloading and flexing the pivoting latch 12 and spindle nut 18, the pivoting latch 12 is clamp to a support bar 19, which may be connected to the welded stainless steel support column 5.

The horizontal forces, illustrated with arrow F3 and F4, is caused by the load from the freezer plates and/or articles. The welded stainless steel support column 5 will absorb all bending moment caused by the force from the load, which is transferred to the support bar 19. The spindle 11 will only be stained by vertical forces directly in center of the spindle 11 transferred through spindle nuts 11.

The invention claimed is:

1. Horizontal plate freezer (1) for freezing articles inside said horizontal freezer during a freezing process comprising:
    a plurality of freezer plates (2) forming a stack of freezer plates (2), where said plurality of freezer plates (2) are arranged substantially horizontal, defining a distance between the freezer plates, where in use articles to be frozen are arranged on one or more freezer plates,
    where said stack of freezer plates are arranged between a top frame (3) and a bottom frame (4), where said top frame (3) is arranged at a horizontal level above the stack of freezer plates (2), and said bottom frame (4) is arranged at a horizontal level underneath the stack of freezer plates (2),
    at least one intervention unit (8) with at least one engaging device (10), where the engaging device (10) is arranged moveable in a longitudinal direction along said intervention unit(s) (8), whereby the engaging device (10) is lifted and lowered along said stack of freezer plates (2),
    at least one displacement device (6) comprising a first end positioned above a topmost freezer plate (2) and a second end connected to said bottom frame (4),
    where said bottom frame (4) is moveably connected to the top frame (3) by the at least one displacement device (6) capable of lifting and lowering the bottom frame (4) to a predefined position, where one or more freezer plates (2) rests on the bottom frame (4),
    where said engaging device (10) can engage individual freezer plates (2) of said plurality of freezer plates (2), and displace said engaged freezer plate (2) thereby providing an increased distance between two adjacent freezer plates (2), and maintain the increased distance during loading and/or unloading of articles to or from said freezer plates (2).

2. The horizontal plate freezer according to claim 1, where said at least one displacement device (6) is an actuator, where a top of said actuator is positioned above a topmost freezer plate (2) and a bottom of said actuator is connected to the bottom frame (4), where said actuator is capable of providing a force between said top frame (3) and said bottom frame (4), at least in an upwards displacement direction of the bottom frame (4), possibly also in a downwards displacement direction of the bottom frame (4).

3. The horizontal plate freezer according to claim 1, where at least one vertical support column (5) is arranged perpendicular and connected to said top frame (3), forming a main frame for the horizontal plate freezer (1).

4. The horizontal plate freezer according to claim 1, where at least one support column (5) is arranged perpendicular to said top frame (3), where said bottom frame (4) is connected to said at least one support column (5), providing a main frame of the horizontal plate freezer.

5. The horizontal plate freezer according to claim 1, where said engaging device (10) comprises at least one pivoting latch (12), where said pivoting latch (12) supports and/or moves at least one freezer plate (2) from a first position to a second displaced position between said top frame (3) and said bottom frame (4).

6. The horizontal plate freezer according to claim 1, where said intervention unit (8) comprises a threaded spindle (11), where said engaging device (10) is arranged moveably in a longitudinal direction along said threaded spindle (11), where the intervention unit (8) can hold the engaging device (10) in a predefined elevated position.

7. The horizontal plate freezer according to claim 1, wherein said engaging device (10) comprises at least one pivoting latch (12), at least one connecting base (14) and at least one actuator (13), where said pivoting latch (12) is moveably attached to the connecting base (14), where said actuator (13) has a first end and a second end, where the first end is attached to the pivoting latch (12), and the second end is attached to the connecting base (14), where said actuator (13) is capable of controlling the pivoting of said at least one pivoting latch (12) in relation to the connecting base (14), where said pivoting latch (12) is capable of supporting and moving at least one individual freezer plate (2) into a predefined position providing a predefined increased distance between said at least one individual freezer plate (2') and at least one underlying freezer plate (2").

8. The horizontal plate freezer according to claim 7, where said engaging device (10) comprises one or more support bars (19) extending perpendicular to said freezer plate (2) and capable of taking up load from said pivoting latch (12), where the pivoting latch (12) is supported by the one or more support bars (19) and is capable of displacing along the support bars (19), where said actuator (13) is capable of pivoting the pivoting latch (12) between a first position where the pivoting latch (12) is disengaged from said freezer plate (2) and a second position where the pivoting latch (12) is engaged with said freezer plate (2), and where at least part of the load from said freezer plate (2) to the pivoting latch (12), when the pivoting latch (12) is engaged with said freezer plate (2), is transferred to said support bars (19).

9. The horizontal plate freezer according to claim 7, where said connecting base (14) is provided with an internally applied threaded aperture for an externally threaded spindle (11), and where a rotation of the threaded spindle (11) moves the connecting base (14), the pivoting latches (12) and the support bars (19) upwards or downwards along the threaded spindle (11).

10. Method of loading and unloading freezer articles to and from a horizontal plate freezer (1), where the horizontal plate freezer (1) comprises
    a plurality of freezer plates (2) forming a stack of freezer plates (2), where said plurality of freezer plates (2) are arranged substantially horizontal, defining a distance between the freezer plates, where in use articles to be frozen are arranged on one or more freezer plates,
    where said stack of freezer plates are arranged between a top frame (3) and a bottom frame (4), where said top frame (3) is arranged at a horizontal level above the stack of freezer plates (2), and said bottom frame (4) is arranged at a horizontal level underneath the stack of freezer plates (2),
    at least one intervention unit (8) with at least one engaging device (10), where the engaging device (10) is arranged moveable in a longitudinal direction along said intervention unit(s) (8), whereby the engaging device (10) is lifted and lowered along said stack of freezer plates (2),
    at least one displacement device (6) comprising a first end positioned above a topmost freezer plate (2) and a second end connected to said bottom frame (4),
    where said bottom frame (4) is moveably connected to the top frame (3) by the at least one displacement device (6) capable of lifting and lowering the bottom frame (4) to a predefined position, where one or more freezer plates (2) rests on the bottom frame (4), where said engaging device (10) can engage individual freezer plates (2) of said plurality of freezer plates (2), and displace said engaged freezer plate (2) thereby providing an increased distance between two adjacent freezer plates (2), and maintain the increased distance during loading and/or unloading of articles to or from said freezer plates (2) the method comprising the following steps:

a. moving the engaging device (10) to a position of a selected individual freezer plate (2) in the horizontal plate freezer (1), b. engaging the engaging device (10) in a supporting contact with the individual freezer plate (2) and maintaining the position, c. displacing the bottom frame (4) with one or more freezer plates (2) supported by the bottom frame (4) downwards away from the top frame (3), thereby proving an increased distance between the selected individual freezer plate (2) and the stack of freezer plates supported by the bottom frame (4), d. loading or unloading articles to be frozen or having been frozen, respectively, onto or from a freezer plate (2) supported by the bottom frame (4) and underlying the selected individual freezer plate (2) supported by the engaging device (10), e. displacing the bottom frame (4) with the one or more freezer plates (2) supported by the bottom frame (4) upwards towards the top frame (3), thereby providing a decreased distance between the selected individual freezer plate (2) and the stack of freezer plates supported by the bottom frame (4).

\* \* \* \* \*